(12) United States Patent
Hymer

(10) Patent No.: US 12,134,470 B2
(45) Date of Patent: Nov. 5, 2024

(54) AIRCRAFT WITH SIDE BODY ARTICULATING PROPULSION

(71) Applicant: Hi-Lite Aircraft, Webberville, MI (US)

(72) Inventor: Jeffrey Hymer, Webberville, MI (US)

(73) Assignee: Hi-Lite Aircraft, Webberville, MI (US)

( * ) Notice: Subject to any disclaimer, the term of this patent is extended or adjusted under 35 U.S.C. 154(b) by 29 days.

(21) Appl. No.: 18/297,941

(22) Filed: Apr. 10, 2023

(65) Prior Publication Data

US 2023/0322376 A1   Oct. 12, 2023

Related U.S. Application Data

(60) Provisional application No. 63/329,665, filed on Apr. 11, 2022.

(51) Int. Cl.
*B64C 29/00* (2006.01)
*B64C 11/00* (2006.01)

(52) U.S. Cl.
CPC ........ *B64C 29/0033* (2013.01); *B64C 11/001* (2013.01)

(58) Field of Classification Search
CPC ... B64C 29/0033; B64C 11/001; B64C 1/061; B64C 1/06; B64C 15/12; B64C 39/026
See application file for complete search history.

(56) References Cited

U.S. PATENT DOCUMENTS

| 3,405,890 | A | 10/1968 | Eickmann |
| 8,616,492 | B2 | 12/2013 | Oliver |
| 10,293,914 | B2 | 5/2019 | Wiegand |
| 10,562,620 | B2 | 2/2020 | Kroo et al. |

(Continued)

FOREIGN PATENT DOCUMENTS

| FR | 729026 A | 7/1932 |
| WO | 2018106137 A2 | 6/2018 |

(Continued)

OTHER PUBLICATIONS

Airbus, Vahana: Our single-seat eVTOL demonstrator, 3 pages, https://www.airbus.com/en/urbanairmobility/cityairbus-hextgen/vahana.

(Continued)

*Primary Examiner* — Timothy D Collins
*Assistant Examiner* — Justin Michael Heston
(74) *Attorney, Agent, or Firm* — Endurance Law Group PLC

(57) ABSTRACT

An aircraft capable of VTOL and forward flight is fitted with a side body articulating propulsion system on the port and starboard sides of the fuselage. The side body articulating propulsion system has plural sets of port and starboard propulsor units controlled for synchronized rotation. The propulsor sets are supported in a triangular airframe designed to support the propulsor units equally spaced apart from one another along a propulsor slope that is angled about 30-60 degrees from horizontal. Synchronized rotation of the propulsor sets is accomplished by an articulation controller, which may be a parallelogram linkage and linear actuator. A port nacelle surrounds the port propulsor units and a starboard nacelle surrounds the starboard propulsor units. A cargo cavity is accessed through the aft end of the airframe. The airframe can be lengthened in the fore direction by attaching an ante-module and/or in the aft direction by an expansion module.

20 Claims, 13 Drawing Sheets

(56) References Cited

U.S. PATENT DOCUMENTS

| | | |
|---|---|---|
| 11,130,568 B2 | 9/2021 | Morris et al. |
| 11,427,300 B2 | 8/2022 | Greenberg et al. |
| 11,472,545 B2 | 10/2022 | Giurca et al. |
| 11,492,106 B2 | 11/2022 | Noppel et al. |
| 11,535,371 B2 | 12/2022 | Moore |
| 2022/0106035 A1 | 4/2022 | Cho et al. |

FOREIGN PATENT DOCUMENTS

| | | |
|---|---|---|
| WO | 2018156041 A2 | 8/2018 |
| WO | 2022053984 A1 | 3/2022 |

OTHER PUBLICATIONS

Blueflite, Blueflite Slate, Electric VTOL News, The Vertical Flight Society, 8 pages retrieved from https://evtol.news/flugauto-unnamed-cargo-drone.

AIRCRAFT WITH SIDE BODY ARTICULATING PROPULSION

CROSS REFERENCE TO RELATED APPLICATIONS

This application claims priority to Provisional Patent Application 63/329,665 filed on Apr. 11, 2022, the entire disclosure of which is hereby incorporated by reference and relied upon.

BACKGROUND OF THE INVENTION

Field of the Invention

The invention relates generally to an aircraft configured for vertical take-off and landing (VTOL) as well as high-speed forward flight, and more particularly to an aircraft powered by multiple articulating propulsors.

Description of Related Art

Transportation is fundamental to connect people, business, and services. Since the early days of aviation, designers and engineers in both the commercial and military aerospace fields have envisioned fixed wing aircraft capable of taking off from a runway no larger than its own shadow, then transitioning to high-speed forward flight. However, the reality of vertical take-off and landing (VTOL) flight for high performance commercial aircraft and military fighters has proven to be a perplexing and obsessive goal. Helicopters and autogyros, both VTOL aircraft of the rotary (non-fixed) wing aircraft types, are often deemed too fragile, too slow and too vulnerable for safe air commerce and/or aerial combat.

Traditional helicopters and rotorcraft generate vertical lift by rotating large rotor blades, pushing air downwards. This downward airflow impacts the structures of the airframe causing a negative impact for vertical flight. Additionally, there must be some type of anti-torque device to counteract the forces of the large aerodynamic and rotational forces of the rotor blades. Complex turbo machinery includes clutches, gearboxes, transmissions. Anti-torque devices add weight and consume power from the main propulsive engine source.

The well-known "VTOL Wheel" produced by AHS International of Fairfax, VA together with its Vertipedia database list some forty-five various aircraft types within the broad category of VTOL capable. Within these forty-five aircraft types, some fifteen various thrust options and some four different propulsion methods can be observed. To date there have been several successful high-speed military VTOL aircraft. These include the MD AIBAE A V-8 Harrier and Lockheed Martin F-35, which incorporate rotating jet nozzles, thrust vectoring and/or lift fan technology.

Notwithstanding past and present accomplishments in the VTOL field, there is a continuing need and desire to design, develop and demonstrate a VTOL fixed wing aircraft with exceptional performance in vertical and cruise flight and operational capability through transition from vertical to forward flight. A particular goal for VTOL fixed wing aircraft is sustained high-speed forward flight in the range of about ~200 kt and 400 kt.

Many such aircraft seeking to meet these design criteria utilize open, exposed rotor blades or propellers that pivot, i.e., articulate, between VTOL and forward flight modes. These commonly include tilt rotor and tilt wing designs. However, there is an ever-present concern that open-exposed rotors or propellers within the human safety zone could be serious safety hazards and create excessive noise. In hostile military environments, open-exposed rotors or propellers are also more vulnerable to flying metal shrapnel and small arms fire. Additionally, complex rotating turbomachinery is subject to increased malfunctions and failures due to the inherent physical loads with rotating center of gravity limits and a changing thrust point. Rotating mechanisms, and the dedicated power supplies that are needed to provide the mechanical rotating transition, add significant aerodynamic instability and make it very difficult to sustain controlled flight. The one engine out envelope is of critical concern, requiring heavy complex cross shafting mechanisms. An adverse consequence inherent in the design of tilt wing, tilt motor aircraft is that high rotor blade forces tend to interact violently on the leading edge of the main wing. The prop wash beating the leading edge can produce exterior skin and interior structural (spar) cracking and fatigue issues.

The V-22 Osprey and the Bell V-280 Valor have articulating, counter rotating blades that negate anti-torque problems, however in the VTOL mode the thrust still impacts the wing surface, causing a negative impact for vertical lift. The Boeing/Sikorsky SB-1 Defiant has a single mast with 2 offset counter rotating blades, again in the vertical lift mode the downward airflow impacting the airframe, again causing a negative impact. The SB-1 also is designed with a variable pitch pusher propeller at the most aft moment of the airframe. Notably these designs are mechanical marvels that require complex turbo machinery, clutches, transmissions, gearboxes and anti-torque devices that are heavy and require an enormous amount of time and expense for MRO maintenance repair and overhaul.

There is, therefore, a need in the art for improved VTOL aircraft of both fixed and rotary wing types that are safe and efficient; that are capable of extended ranges, higher speeds, greater payloads, lower noise signatures, lower carbon footprints, and reduced operating costs.

BRIEF SUMMARY OF THE INVENTION

This invention comprises an aircraft configured for vertical take-off/landing (VTOL) and forward flight. The aircraft has a fuselage whose nose and tail define a longitudinal direction. The fuselage also has a port side and a starboard side that defines a lateral direction, and a height that defines a vertical direction. The vertical direction is oriented orthogonal to both longitudinal and lateral directions. An airframe structurally supports the fuselage. The airframe includes a plurality of primary journals. Each primary journal extends laterally through the fuselage and establishes an articulation axis. The plurality of articulation axes are offset from one another by a common rise in the vertical direction and a common run in the longitudinal direction such that all of the articulation axes are equally spaced apart along a propulsor slope. The propulsor slope is thus defined by the common rise and the common run and is angled from the longitudinal direction between about 30-60 degrees. The aircraft includes a side body articulating propulsion system. The side body articulating propulsion system is operatively connected to the airframe and includes a plurality of propulsor sets. Each propulsor set is associated with a respective one of the primary journals of the airframe, so that the number of propulsor sets equals the number of primary journals. Each propulsor set comprises a port propulsor unit and a starboard propulsor unit. As the name suggests, the port propulsor unit is on the port side of the fuselage and the starboard propulsor unit is on the starboard side of the fuselage. An articulation controller collectively connects all of the propulsor sets so that all of the port and starboard propulsor units rotate in synchronization about their respective the articulation axes. The articulation controller thus pivots all of the propulsion units together, in concert, between VTOL and forward flight positions.

The invention addresses the need for improved VTOL aircraft of both fixed and rotary wing types that are safe and efficient, capable of extended ranges, higher speeds, greater payloads, lower noise signatures, lower carbon footprints, and reduced operating costs. The side body articulating propulsion system enables a next generation solution suitable for a wide range of applications. The propulsor sets produce VTOL thrust then articulate to produce high-speed forward flight. A particular advantage of the side body articulating propulsion system is that the propulsive thrust can remain as undisturbed airflow throughout the transition process in a manner executed with simply and efficiency.

The side body articulating propulsion system includes port and starboard propulsor units mounted on the sides of the fuselage airframe providing a lift plus cruise functionality. The propulsor units articulate to produce vertical lift then transition to high-speed forward flight in a controlled manner. The propulsor sets are staggered in height relative to each other so the airflow/thrust does not materially interfere with the other propulsors. The propulsor units can, if desired, be enclosed for stealth and/or safety vis-à-vis ground personnel.

The side body articulating propulsion system results in a very low airflow vibration signature, and can be adapted for low noise. All of the propulsive energy/thrust during vertical lift and high-speed forward flight flows directly through the airframe, bypassing the fixed or rotary wing features.

When optionally designed with a fixed main wing, the aircraft can take-off and land as a conventional aircraft which substantially increases its take-off and landing weight. Reducing maintenance costs, hourly operations costs, extended life-cycle costs are of utmost importance. When optionally designed with a rotary wing, the aircraft can cruise at increased forward airspeeds in a more efficient manner when compared with traditional rotary craft.

BRIEF DESCRIPTION OF THE SEVERAL VIEWS OF THE DRAWINGS

These and other features and advantages of the present invention will become more readily appreciated when considered in connection with the following detailed description and appended drawings, wherein.

DETAILED DESCRIPTION OF THE INVENTION

Figure 1:
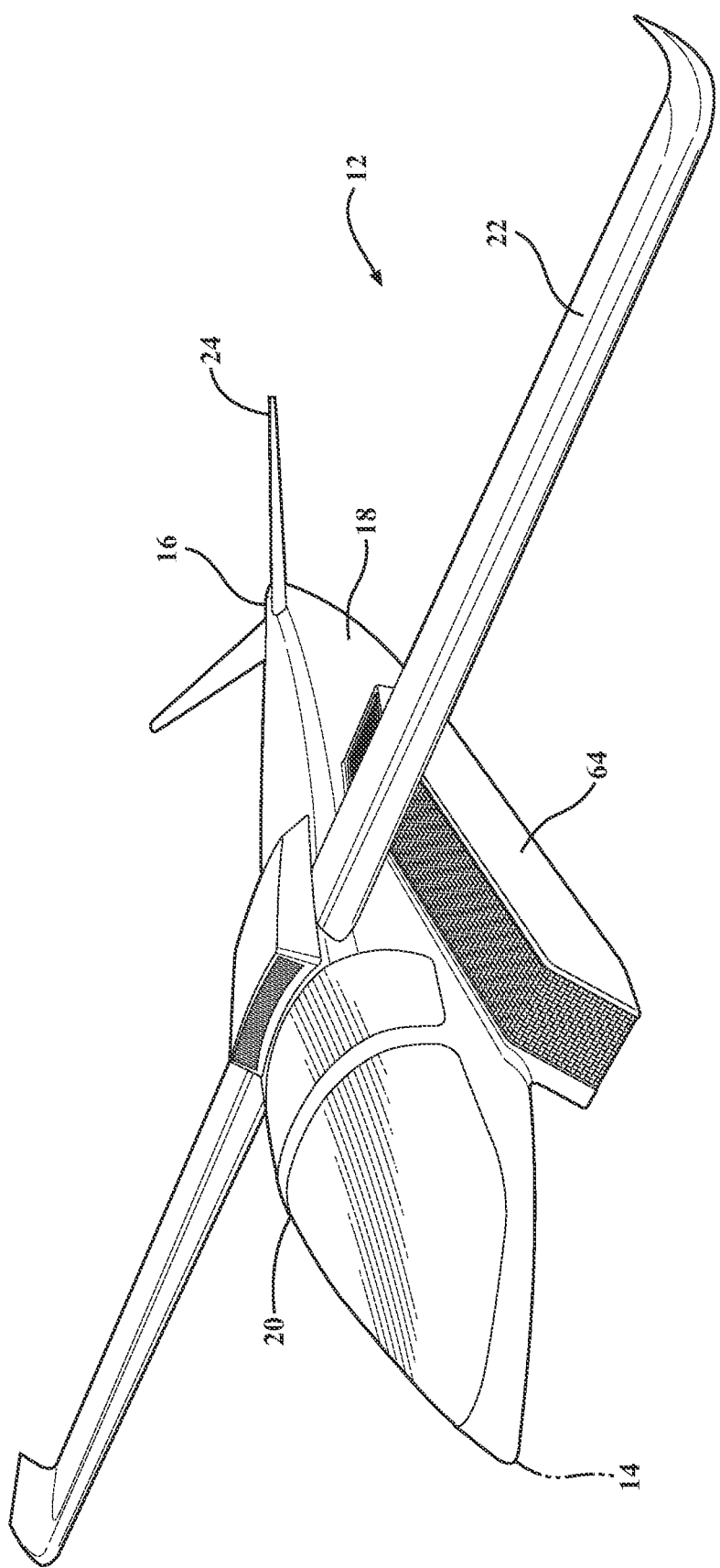
FIG. 1 is a perspective view of an aircraft configured with articulating side-body propulsors according to an embodiment of the invention.

Referring to the figures, wherein like numerals indicate like or corresponding parts throughout the several views, an aircraft 12 configured for forward flight and vertical take-off/landing (VTOL) is shown in one exemplary form in FIG. 1. The aircraft 12 has a fuselage which forms a body or shell within which people, equipment and/or cargo are carried. The fuselage has a nose 14 and a tail 16 defining a longitudinal direction. That is to say, when the aircraft 12 is in forward flight, the direction of movement is in the longitudinal direction with the nose 14 leading. A feature of the aircraft 12 that extends from adjacent the nose 14 toward the tail 16 will be said to extend longitudinally or in the longitudinal direction. The fuselage has a port side 18 and a starboard side 20 defining a lateral direction, as is customary with aeronautical craft. A feature of the aircraft 12 that extends from port to starboard or vise-versa will be said to extend laterally or in the lateral direction. The fuselage has a height that defines a vertical direction. The vertical direction lies orthogonal to both of the longitudinal and lateral directions.

The various examples of aircraft 12 shown throughout the accompanying illustrations have a fixed main wing 22 connected to the fuselage, that functions to provide lift during forward flight. The main wing 22 extends laterally outwardly from the port 18 and starboard 20 sides of the fuselage. The form depicted in FIG. 1 is that of a fixed wing type with high-mounted main wing 22. Contemplated embodiments of the invention include a main wing 22 (or multiple wings) of any type and shape and arrangement suitable for the intended application, including but not limited to blended body and hybrid wing body configurations. In these configurations, the aircraft 12 will likely include one or more flight control surfaces such as ailerons, elevator and rudder. The rendering of FIG. 1 combines the two latter-mentioned control surfaces in the form of a V-tail or ruddervator 24.

Despite the portrayal of fixed wing style aircraft 12 throughout the illustrations, the aircraft 12 of this invention can take many different forms. Importantly, the general principles of this invention are directly applicable as well to various forms of rotary wing aircraft 12, including autogyros and helicopters having single-rotor and multi-rotor configurations. Thus, although the illustrations depict the exemplary embodiments within the context of fixed wing aircraft 12, those of skill in the art will understand that the forward flight lift function could instead be performed by one or more rotary wings.

An airframe 26 refers to the mechanical supporting structure for the fuselage and wings/rotors. The airframe 26 is often covered with a thin skin, and thus not visible from the exterior as in the example of FIG. 1. The airframe 26 is often fabricated as a lightweight, cage-like, internal skeletal truss structure, covered with a thin skin made of canvas or sheet metal. The skin covering may be omitted, either partially or entirely, exposing the airframe 26. Other airframe 26 design schemes are possible, including monocoque configurations in which the supporting structure is integrated with the skin covering. In the case of the aforementioned truss-type configurations, the airframe 26 may be fabricated from tubular links joined to one another at ends and at overlaps. The links may be made from any lightweight material suitable for aviation applications, including but not limited to tubes of aluminum or carbon fiber or other suitable materials. The resulting airframe 26 structure, regardless of the form chosen, seeks to optimize its strength-to-weight ratio so that the aircraft 12 is as light and strong as needed for the intended application.

Figure 4A:
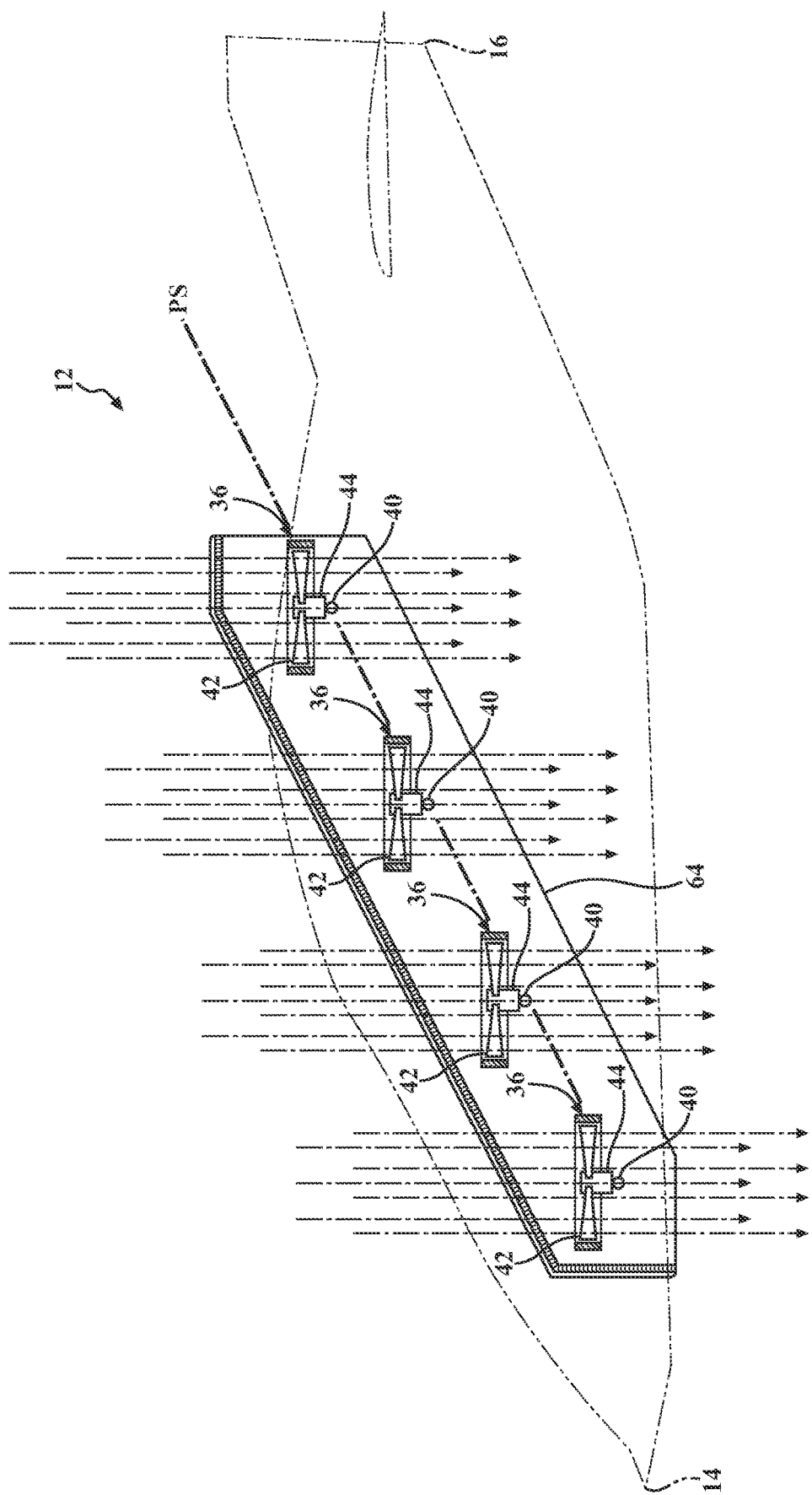
FIGS. 4A-C are a progression of schematic side-views showing the port side of an exemplary aircraft in phantom having articulating side-body propulsors oriented for vertical, upward angular and forward flight, respectively.
Figure 4B:
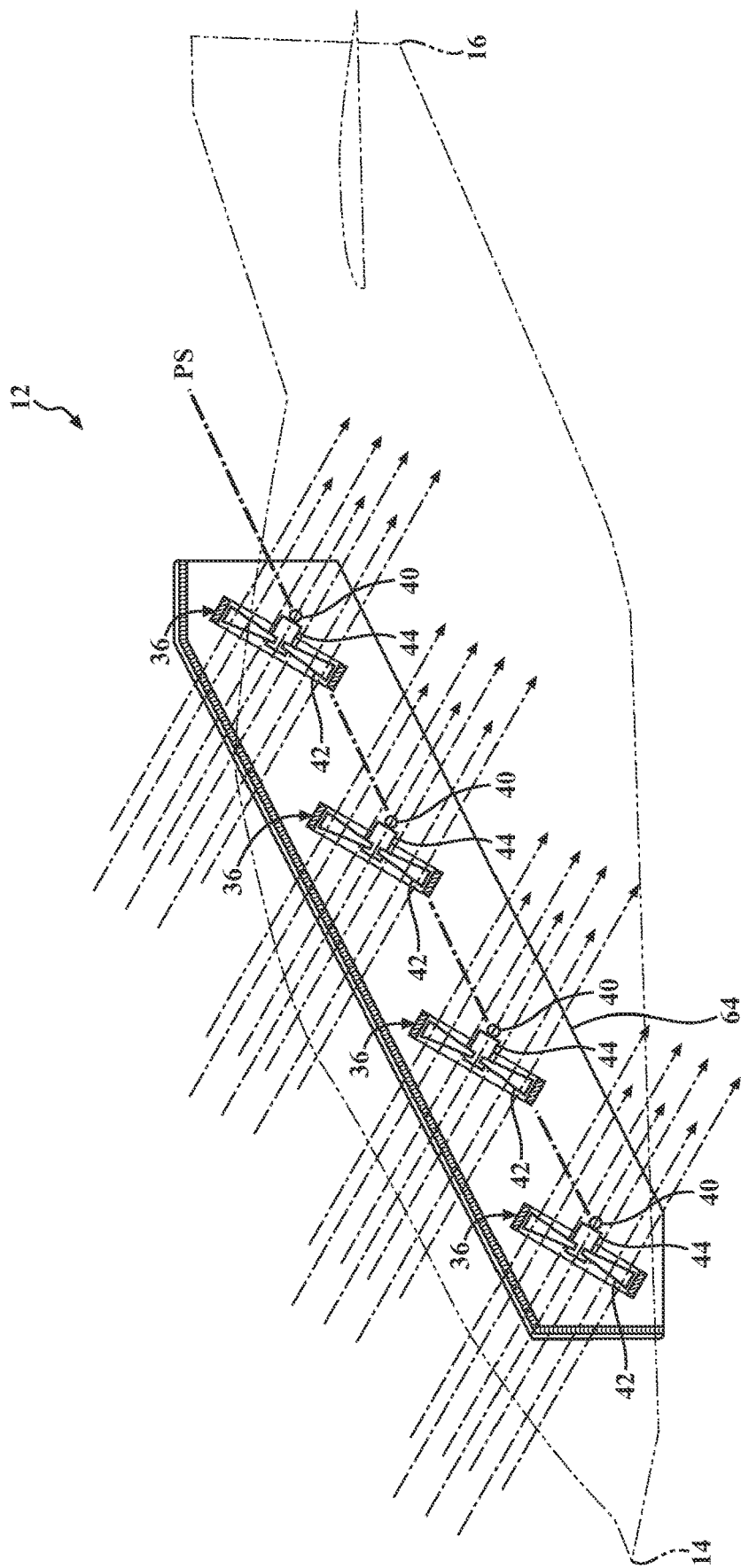
Figure 4C:
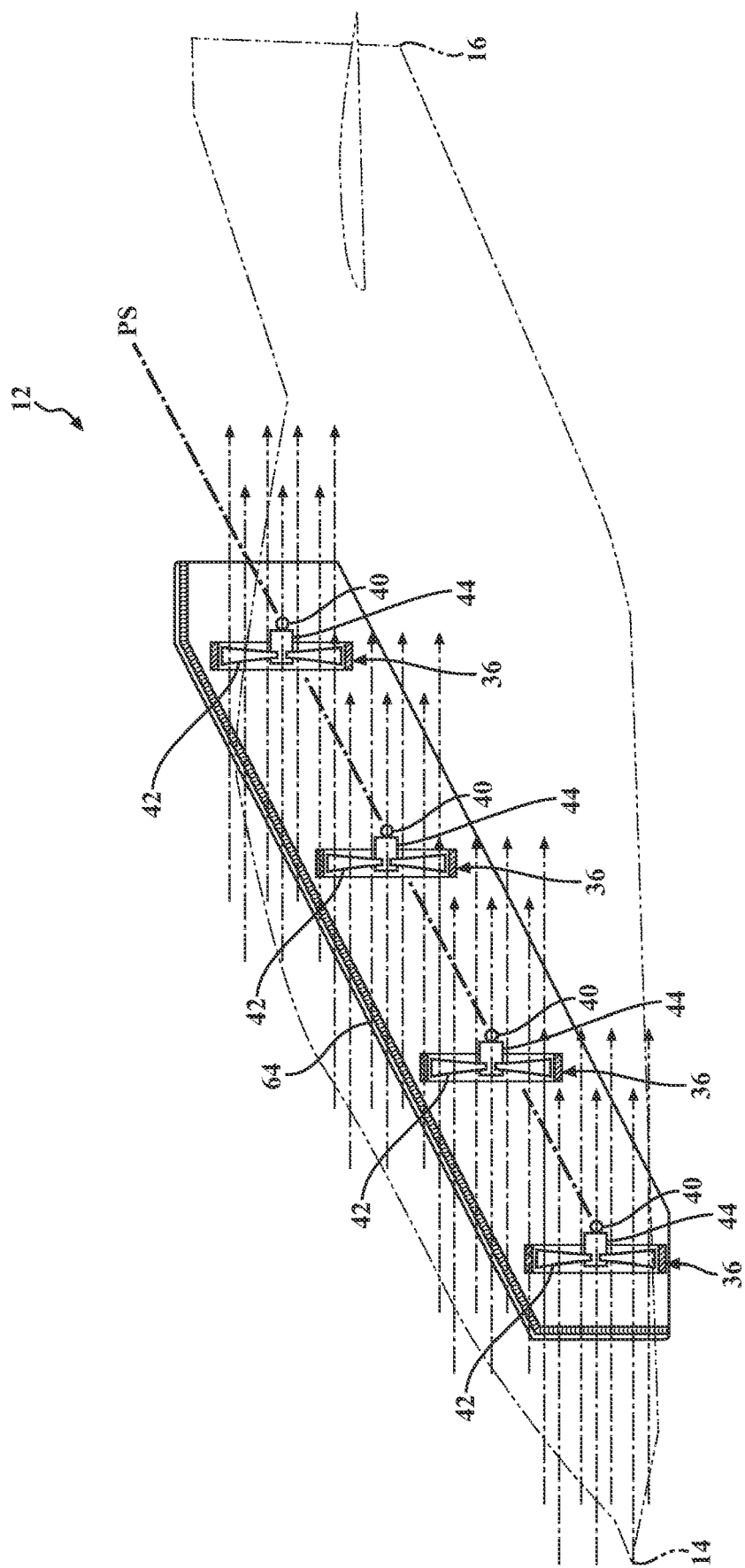
Figure 5:
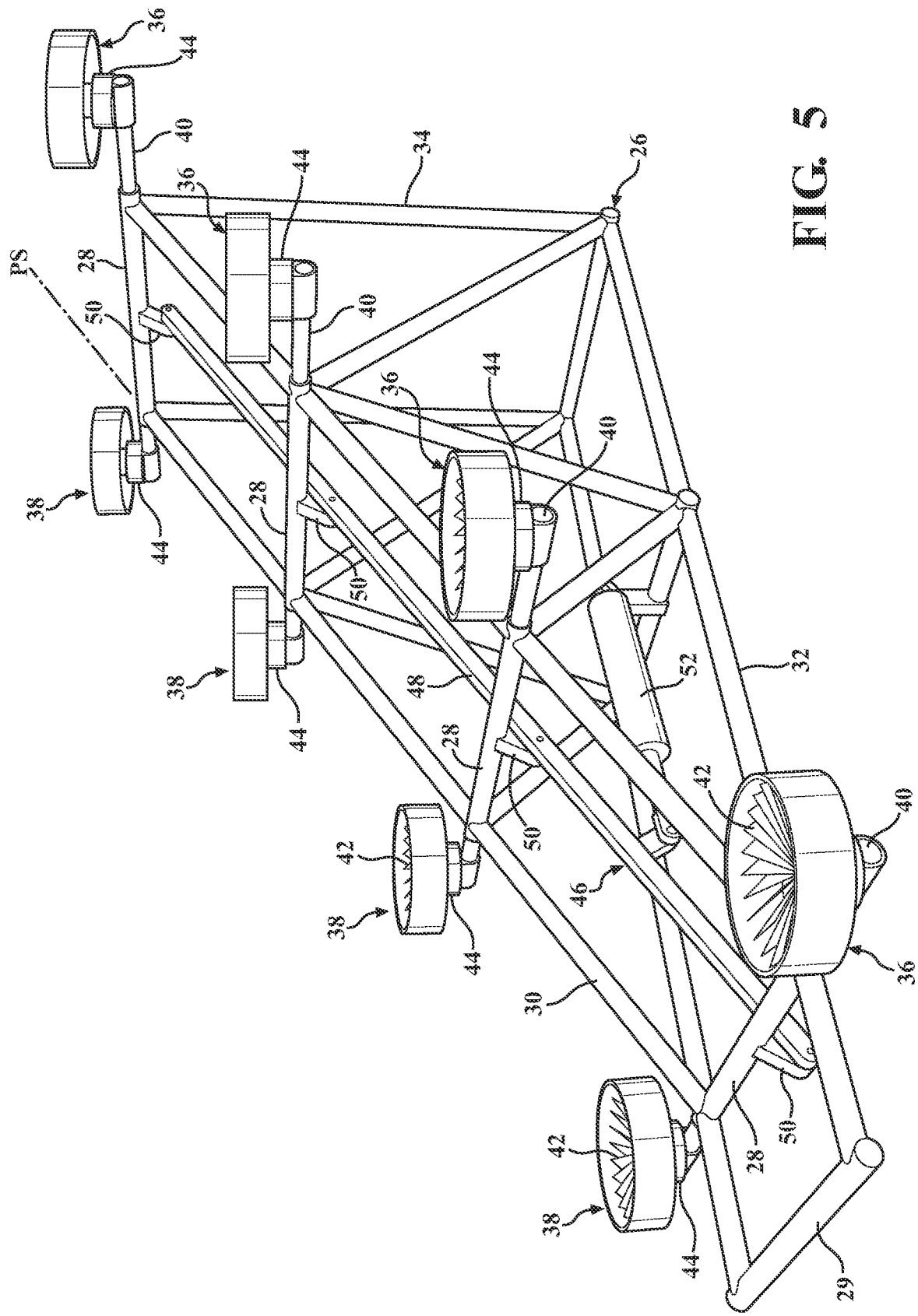
FIG. 5 is a perspective view of an airframe according to an exemplary embodiment of the invention, the airframe is configured with four primary journals to support four propulsor sets, respectively, all oriented to perform vertical take-off and landing.
Figure 6:
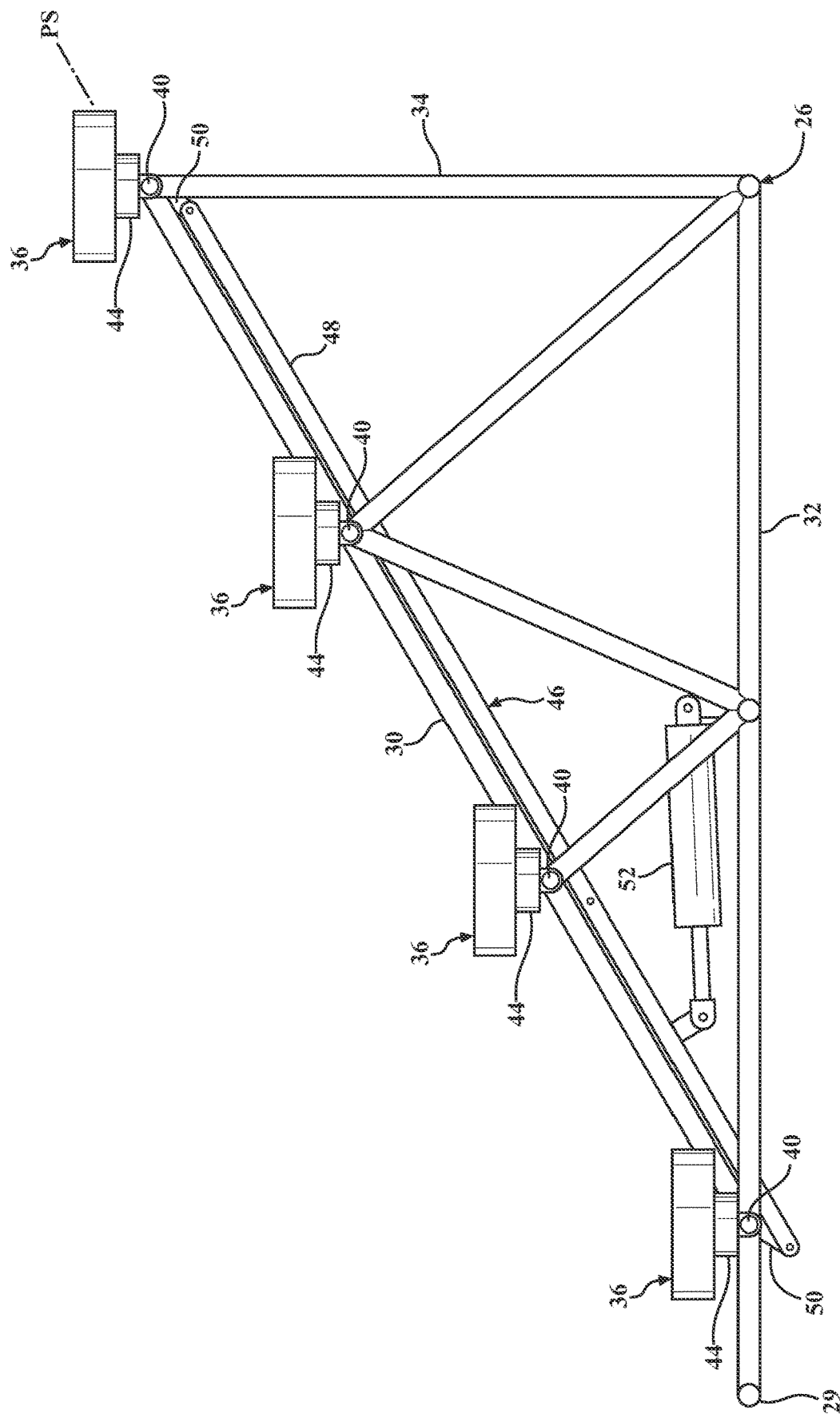
FIG. 6 is a side view of the airframe of FIG. 5 showing an exemplary articulation controller in the form of a parallelogram linkage, collectively connecting each propulsor set for synchronized rotation about its articulation axis.
Figure 7:
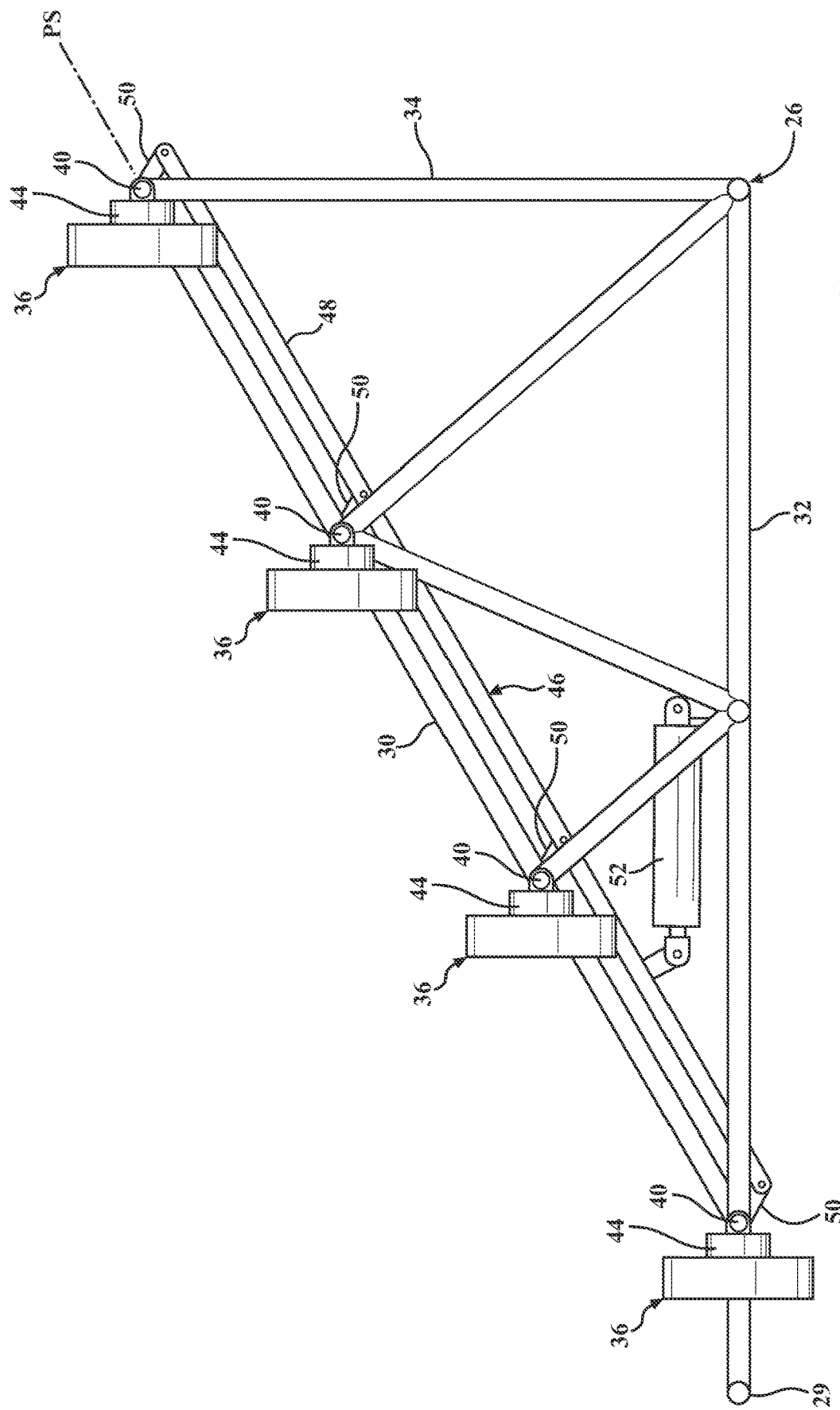
FIG. 7 is a view as in FIG. 6 showing the articulation controller actuated so that each propulsor set is oriented toward a forward flight position.

Referring now to FIGS. 5-7, the airframe 26 includes a plurality of primary journals 28, each extending parallel to one another, and extending laterally through the fuselage. In the preferred embodiments, the airframe 26 is fitted with at least three primary journals 28. The examples of FIGS. 2-8 all show examples of an airframe 26 having four primary journals 28. Thus, the number of primary journals 28 could be two, although three or four or more are preferred.

The illustrated examples show the primary journals 28 as elongated bushings in the form substantially continuous tubes that extend between the port 18 and starboard 20 sides of the airframe 26. However other configurations are possible. For one example, instead of a continuous tube, each primary journal 28 could be composed of two or more bearing blocks laterally spaced apart from one another in alignment, like the knuckles of a door hinge. Indeed, many alternative configurations are possible.

Each primary journal 28 establishes a discrete articulation axis that extends in the lateral direction. In other words, each primary journal 28 extends between the port 18 and starboard 20 sides of the fuselage, perpendicular to the longitudinal direction, and creates its own articulation axis. Each articulation axis is offset from the next adjacent articulation axis by a common rise in the vertical direction and a common run in the longitudinal direction. That is to say, the spacing between each adjacent articulation axis is the same for all of the primary journals 28. In this manner, all of the articulation axes are equally longitudinally and vertically spaced apart from one another. Moreover, all of the articulation axes lie along a propulsor slope PS defined by the common rise and the common run. Just as rise and run can be used in the construction trades to determine the slope of a pitched roof, so too is rise and run useful here to describe the propulsor slope PS. This is perhaps best seen in FIGS. 6 & 7. The propulsor slope PS can be varied greatly depending on the design application. It is envisioned, however, that the majority of applications will establish the propulsor slope PS in the range of about 30-60 degrees measured from the longitudinal direction. In some respects, a propulsor slope PS of 45° could be considered mathematically advantageous for reasons that will be explained. In FIGS. 4A-7, the propulsor slope PS is set at about 30° measured from the longitudinal direction, and thus on the low end of the preferred range.

Whether the airframe 26 is fabricated as truss structure as in FIGS. 5-7 or in one of the modern monocoque configurations (not shown), it is contemplated that the airframe 26 will securely support a plurality of primary journals 28, each extending parallel to one another, extending laterally through the fuselage, such that each articulation axis lies along a propulsor slope PS defined by a common rise and a common run. Thus, it can be said that a distinctive attribute of the airframe 26 is that it sustains the primary journals 28 parallel to one another and evenly spaced apart along a common propulsor slope PS.

The propulsor slope PS may be angled vertically upwardly or vertically downwardly from the longitudinal direction. In the illustrated examples, the propulsor slope PS is shown angled vertically upwardly from the longitudinal direction. That is to say, the leading primary journal 28 adjacent the nose 14 is in the vertically lowest position, whereas the last primary journal 28 adjacent the tail 16 is in the vertically highest position. This creates the appearance of an upward rising propulsor slope PS with reference to forward flight. Those of skill in the art will appreciate that the principles of this invention can be applied with equal or at least satisfactory effect by configuring the airframe 26 so that the propulsor slope PS is angled vertically downwardly from the longitudinal direction. In that case, the leading primary journal 28 adjacent the nose 14 would be in the vertically highest position and the last primary journal 28 adjacent the tail 16 would be in the vertically lowest position, creating the appearance of a downward falling propulsor slope PS with reference to forward flight.

The airframe 26 can be configured as a modular structure in which the features thus far described constitute a primary module. The plurality of primary journals 28 are part of the primary module. In most cases, it is expected that the primary module will be disposed adjacent the nose 14. However, in some contemplated applications an ante-module 29 can be attached to the leading end of the primary module. The ante-module 29 is shown in FIGS. 5-7 in the exemplary form of a short cantilever stub, however other more complex forms can be devised to suit the application.

As shown in FIGS. 5-7, the primary module may have a generally triangular shape when viewed in side elevation. Although, other geometric shapes are possible, including regular and irregular quadrilateral and pentagonal shapes. Regardless of the geometric shape of the airframe 26 when viewed in side elevation, in at least some embodiments a front side or leg 30 of the airframe 26 will be parallel to the propulsor slope PS of the articulation axes, and may even lie along the propulsor slope PS. Although, it is possible and contemplated that a particular engineered application could call for no sides of the airframe 26 geometry (in side elevation) to be parallel to the propulsor slope PS.

Moreover, the triangular shape of the primary module can, if suited to the application, be formed in the shape of a right or acute scalene triangle (when viewed in side elevation) having a long front leg 30, a base 32 and an aft end 34. In the illustrated examples, the primary journals 28 and associated articulation axes all lie along, or at least parallel to, the front leg 30. The base 32 is generally horizontal and intersects the front leg 30 adjacent the nose 14 of the fuselage. The aft end 34 intersects the front leg 30 and the base 32 adjacent the tail 16 of the fuselage. The aft end 34 will be generally vertical in the case of a right triangle, and canted toward the tail 16 in the case of an acute scalene triangle. Configurations where the front leg 30 and aft end 34 are above the base 32 correspond to the propulsor slope PS being angled vertically upwardly from the longitudinal direction, as shown in the illustrations. As was mentioned, the invention contemplates an alternative embodiment in which the propulsor slope PS is angled vertically downwardly from the longitudinal direction, in which case the appearance would be inverted from that shown in FIGS. 6 & 7, with the front leg 30 and aft end 34 being located below the base 32. In cases where the front leg 30 is parallel to the propulsor slope PS of the articulation axes, it is expected that the included angle measured between the base 32 and the front leg 30 will likewise fall in the range of about 30-60 degrees.

A particular advantage of the right or acute scalene triangular airframe 26 configuration is that a cargo cavity will naturally form inside the structural members in the airframe 26, as can be best appreciated from FIG. 5. Access to the cargo cavity can be gained through the aft end 34. In the case of an aircraft 12 like that shown in FIG. 1, a rear opening hatch (not shown) would be created in the fuselage, near its tail 16, enabling cargo to be stored inside at least a portion of the airframe 26 interior.

A side body articulating propulsion system is operatively connected to the airframe 26. The side body articulating propulsion system includes a plurality of propulsor sets, each propulsor set being associated with a respective one of the primary journals 28. To say another way, a propulsor set is associated with each primary journal 28 of the airframe 26, forming a powerplant for both forward and vertical flight of the aircraft 12. Each propulsor set comprises a port propulsor unit 36 and a starboard propulsor unit 38. The port 36 and starboard 38 propulsor units are typically matched in terms of size, weight and thrust, although they may be configured to spin in opposite directions (CW and CCW) to offset gyroscopic forces. The gang or group of propulsor sets supported among all of the primary journals 28, forms a collective side body articulating propulsion system for the aircraft 12.

The side body articulating propulsion system thus comprises a plurality of port propulsor units 36 and an equal plurality of starboard propulsor units 38 that can be located very close to the fuselage. In the illustrated examples, the port 36 and starboard 38 propulsor units are stationed in longitudinal rows directly alongside the fuselage. Torsional stresses generated by the thrust of the propulsor units are minimized by locating the port 36 and starboard 38 propulsor units as close as possible to the longitudinal centerline of the aircraft 12. Moreover, thrust loads imposed on the airframe 26 can be predominantly, or even entirely, isolated from the main wing 22 thereby avoiding the need to structurally fortify the main wing 22 which is a significant drawback with wing-mounted thruster designs such as the Bell V-280 Valor and the V-22 Osprey.

Although FIGS. 1-4C depict aircraft 12 that utilize the side body articulating propulsion system as the exclusive source for thrust needed to achieve both forward and vertical flight, in some contemplated embodiments the aircraft 12 may include one or more additional propulsion schemes, including but not limited to puller or pusher props and/or rotors of the type used in helicopter configurations. Therefore, it is to be understood that the side body articulating propulsion system of this invention can either be used as the exclusive source of thrust for forward and vertical flight for an aircraft 12, as the primary but not exclusive source of thrust for forward and/or vertical flight, as a supplemental source of thrust for forward and/or vertical flight, or as a normally dormant redundant back-up source of thrust for forward and/or vertical flight that is deployed for emergency situations.

Each propulsor set may include a primary drive shaft 40 that is operatively associated with each primary journal 28 of the airframe 26. Each primary drive shaft 40 rotatably supports the associated port 36 and starboard 38 propulsor units for concerted rotary movement about the articulation axis thereof. In the examples shown, each primary drive shaft 40 is in the form of a continuous rod-like member that is carried in its respective primary journal 28. The primary drive shaft 28 extends laterally outwardly from the port 18 and starboard 20 sides of the airframe 26 creating exposed cantilever ends. Thus, in the illustrated examples, both exposed cantilever ends will rotate concurrently about the associated articulation axis. Those of skill in the art will envision other configurations and arrangements in which the primary drive shaft 40 could be something other than a continuous rod-like member. In one alternative example, each primary driveshaft 40 could be disjointed between the cantilevered ends. In another alternative example, the primary driveshaft could be a linkage or group of linkages that enable controlled rotary movement of the associated port 36 and starboard 38 propulsor units about the associated articulation axis. Indeed, many design variations are possible.

Each port 36 and starboard 38 propulsor unit has at least one propeller 42. The term propeller is used in the most general sense to include all forms of propellers, impellers, turbines blades, etc. Each propeller 42 is fixedly attached to the output shaft of a propulsor motor 44, or of an intervening transmission, so that the propeller 42 can be rotatably driven to produce thrust along a vector generally perpendicular to the associated articulation axis, as depicted schematically in FIGS. 4A-C. The propulsor motors 44 can be electric motors or combustion engines or of a type driven by any other known type of energy source. Each propeller 42 is composed of a plurality of blades each extending radially from a central hub attached to the output shaft. Each blade terminates at a distal tip.

In a traditional open-tip design, the maximum or major diameter of the propeller 42 is established by its distal tips. If the propeller 42 is of the type having an annular thrust ring joining each of the tips of the blades into a monolithic co-rotating structure, the major diameter is then established by the thrust ring. Those of skill in the art will be familiar with a common rotor blade length to gross weight ratio that is generally accepted as common for all VTOL aircraft. The aircraft 12 of the present invention will of course conform to the common rotor blade length to gross weight ratio. However, the designed may take into account that the propeller 42 may be advantageously sized so that its major diameter is either between about 0.75-1.25 times the fixed rise, or between about 0.75-1.25 times the fixed run, whichever is smaller. For example, if a particular airframe 26 is designed so that it supports primary journals 28 in succession at a common rise of twenty-eight inches (28") and a common run of forty-eight inches (48"), according to this formula the propeller 42 major diameter will be constrained by the common rise, which is smaller than the common run in this instance. Thus, taking the smaller common rise of twenty-eight inches (28") and multiplying by 0.75-1.25 times, the calculated optimal propeller 42 major diameter is determined to be between twenty-one inches (21") and thirty-six inches (36").

The significance of these dimensional constraints for the propeller 42 will be described in connection with FIGS. 4A-C, where views are suggested showing in simplified fashion a group of port propulsor units 36 of the type comprising a portion of a side body articulating propulsion system of the type contemplated by this invention. In FIG. 4A, port propulsor units 36 are all pivoted to produce downwardly directed thrust. FIG. 4A is typical of a vertical take-off scenario, where the aircraft 12 is lifted from the ground. When a suitable altitude has been reached, the aircraft 12 can transition to forward flight. Carefully, the port propulsor units 36 are pivoted in concert so that they produce thrust having a longitudinal component in addition to a vertical component, as shown in FIG. 4B. When sufficient forward velocity has been achieved to provide lift from either a fixed wing 22, or when lift is provided by a rotor(s), the propulsor units 36 can be pivoted synchronously further and further until they arrive at the full forward flight position shown in FIG. 4C. Here, the thrust vectors from the propulsor units 36 are rearwardly directed. Throughout these positions (FIGS. 4A-C), it will be understood that the starboard propulsor units 38 will be rotated in concert with their port propulsor unit 36 counterparts so that the entire side body articulating propulsion system produces thrust in the same angular direction.

Now, returning to the significance of the aforementioned dimensional constraints for the propeller 42, the example of FIGS. 4A-C suggest a propulsor slope PS is on the low end of the preferred range, that is at about 30° measured from the longitudinal direction. The previous example of an airframe 26 designed with a common rise of twenty-eight inches (28") and a common run of forty-eight inches (48") produces a propulsor slope of about 30.3°. Therefore, FIGS. 4A-C generally comport with the previous example, such that the propeller 42 major diameter should be constrained by the common rise, which is smaller than the common run. Assuming for purposes of illustration that the common rise is twenty-eight inches (28"), we said that the calculated optimal propeller 42 major diameter should be between twenty-one inches (21") and thirty-six inches (36"). This range was achieved by multiplying the common rise by 0.75-1.25.

The goal of the range determined by multiplying the smaller of the common rise or run by 0.75-1.25 to determine propeller 42 size is intended to maximize thrust while avoiding, or at least minimizing, interference of downwind propeller thrust. When the common rise is smaller than the common run, the greatest chance of thrust interference will occur when the propulsor sets are in the forward flight position, exactly as portrayed in FIG. 4C. On the other hand, when the common run is smallest, the greatest chance of thrust interference will occur when the propulsor sets are in the VTOL position portrayed in FIG. 4A.

Figure 11:
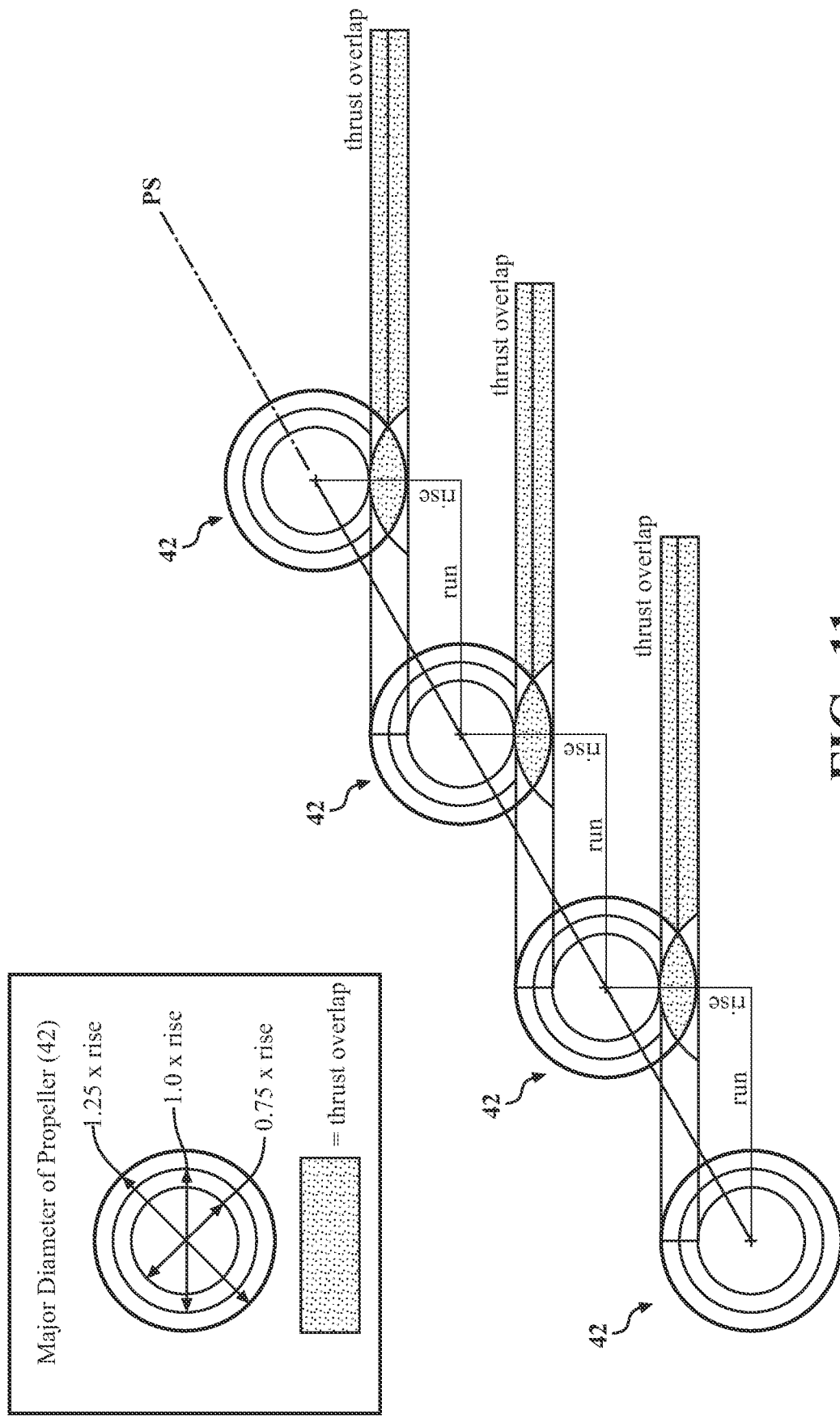
FIG. 11 is a diagram demonstrating potential maximum interference of propellor thrust when the airframe and propellers are sized according to certain preferred ranges.

In every case, the thrust interference is altogether avoided when the major diameter of each propellor 42 is less than or equal to the smaller of the common rise/run. That is to say, if the common rise is smallest, the major diameter of the propellors 42 must be less than or equal to the measure of the common rise to avoid thrust interference. FIG. 11 is drawn as a schematic example of an airframe 26 having its common rise being smaller than its common run. When the major diameter of the propellors 42 is in the range of 0.75-1.0 times the common rise, there is no thrust interference with respect to the trailing propeller 42. However, when the major diameter is greater than 1.0 times the common rise, interference occurs. Fortunately, the interference is relatively negligible up to 1.25 times the common rise (or common run, in cases whether run is smallest). As illustrated in FIG. 11, it can be seen that thrust interference occurs only at tips of the two adjacent propellers 42, producing a football-shaped or somewhat elliptical region of hyper-turbulent thrust. By limiting the major diameter of the propellers 42 to at most 1.25 times the common rise or common run (whichever is smaller), thrust interference is maintained to an acceptable minimum.

The lower range of the propeller size formula, stated as 0.75 times the common rise or common run (whichever is smaller), seeks to prevent the propellers 42 from being too small for the design parameters, and thus not adequately capitalizing on the thrust potential. All things considered, most aeronautical engineers and designers of VTOL aircraft will seek to maximize the thrust output from the side body articulating propulsion system. The formula of sizing the propeller 42 to fall between about 0.75-1.25 times the common rise or common run, whichever is smaller, seeks to optimize the propulsion performance of the aircraft 12.

Considering the mathematical principles of trigonometry, it can be appreciated that an airframe 26 configured with a propulsor slope PS of 45° will enable the propellers 42 to be designed with the largest possible major diameter in the most efficient overall package size of the side body articulating propulsor system. This is because in an airframe 26 having a propulsor slope PS of 45°, the common rise will be equal to the common run. The thrust output from the side body articulating propulsion system can be maximized for both VTOL and forward flight while maintaining the major diameter of the propellers 42 to between about 0.75-1.25 times the common rise/run.

The aircraft 12 can be made to function satisfactorily using propellers 42 of any suitable commercially available design. Notwithstanding, the propellers 42 can be optimized for VTOL and forward flight applications by conforming to the teachings found in U.S. Pat. No. 11,465,739 to Hymer, the entire disclosure of which is hereby incorporated by reference and relied upon. Specifically, each propeller 42 can include an annular thrust ring concentrically disposed about the hub, joining each of the distal tips of the blades into a monolithic co-rotating structure. The thrust ring has an aerodynamic profile designed to redirect radial air leakage into thrust and deflect undesirable sounds and heat that may otherwise be directed toward the fuselage. As a result, the propeller 42 is more efficient and quieter than traditional open bladed propeller designs due at least in part to reduced blade vibrations. Furthermore, the thrust ring eliminates induced drag around the distal tips of the blades, and is generally considered safer than a traditional open bladed propeller. For all of these reasons, a propeller 42 designed according to the teachings of in U.S. Pat. No. 11,465,739 will result in an ultra-efficient propulsor having a much lower noise signature than traditional designs.

The side body articulating propulsion system may include an articulation controller, generally indicated as 46. The articulation controller 46 collectively connects each propulsor set for synchronized rotation about the respective the articulation axis. That is to say, the articulation controller 46 is responsible for shifting in coordination the port 36 and starboard 38 propulsor units between VTOL and forward flight positions. In most modern applications, it is expected that the articulation controller 46 will be assisted in operation by a flight management computer, The flight management computer will command the articulation controller 46 for stabilized VTOL operation or transition to high-speed forward flight.

Figure 2:
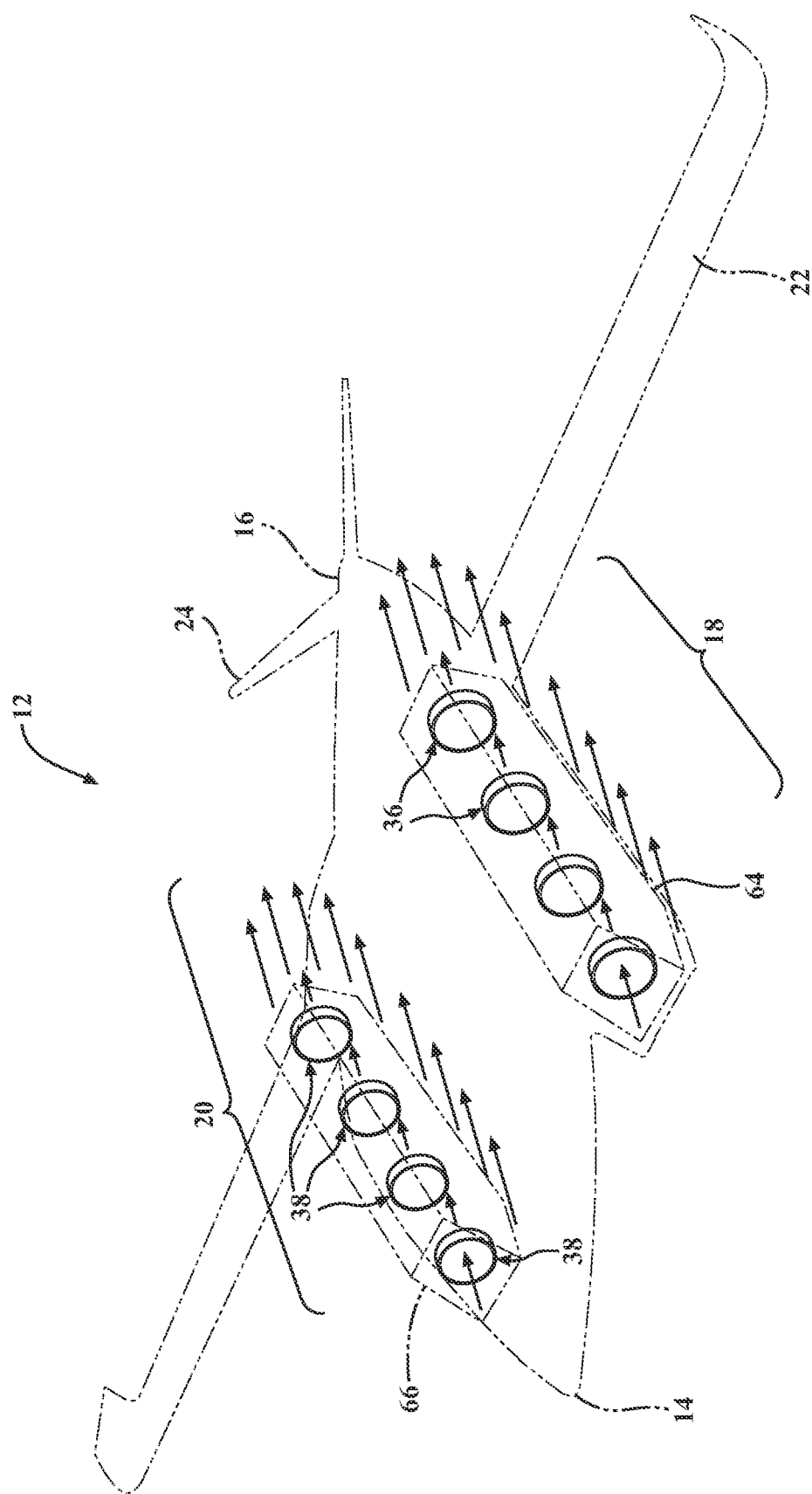
FIG. 2 is a highly simplified perspective view showing an exemplary aircraft in phantom with articulating side-body propulsors oriented for forward flight.
Figure 3:
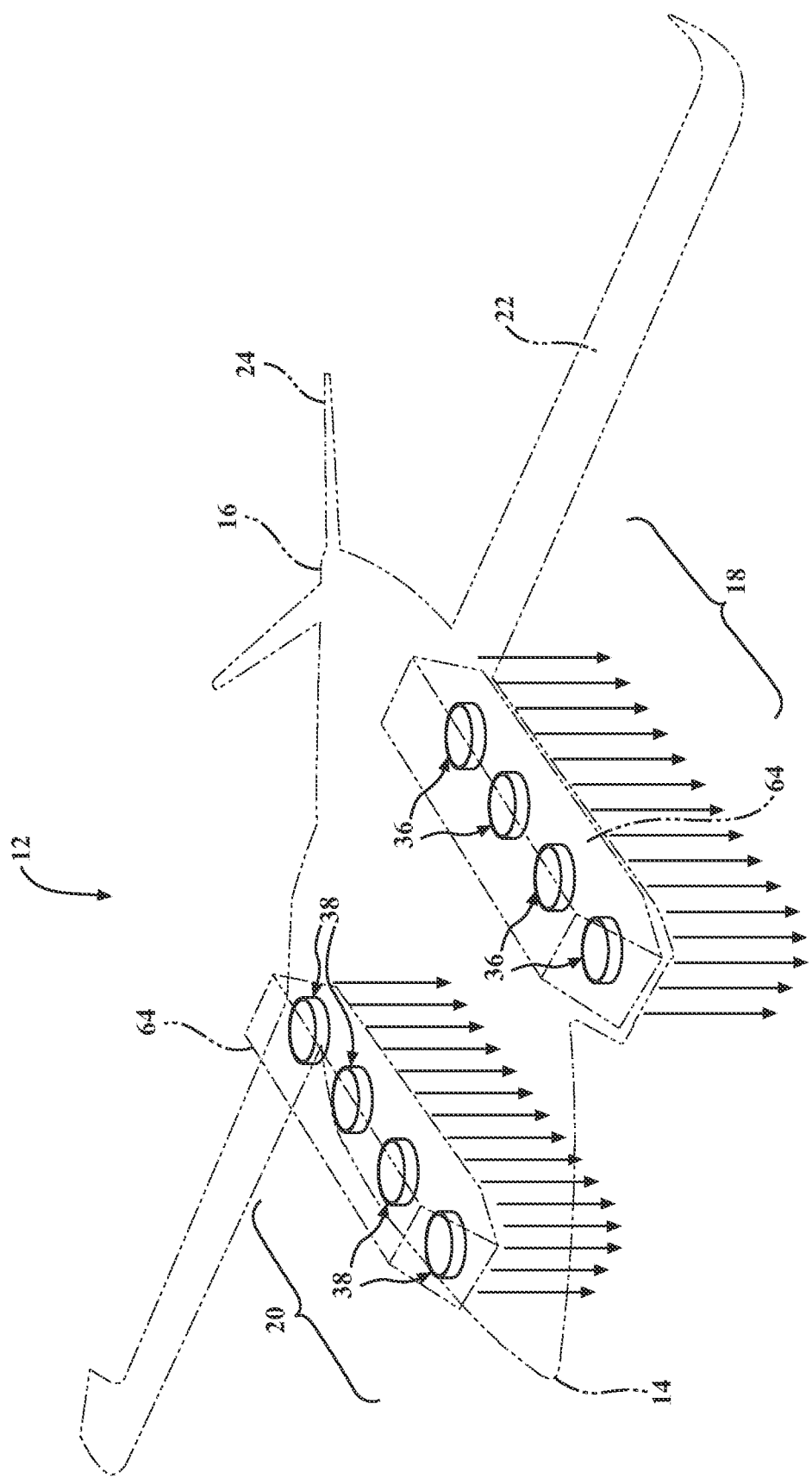
FIG. 3 is a view as in FIG. 2 showing the articulating side-body propulsors oriented for vertical take-off and/or landing.

The highly schematic view of FIG. 2 shows all of the port 36 and starboard 38 propulsor units in a side body articulating propulsion system pivoted to a forward flight position, in which thrust vectors are rearwardly directed. FIG. 3 is similar to FIG. 2, but shows all of the port 36 and starboard 38 propulsor units pivoted to a VTOL position, in which thrust vectors are downwardly directed. The articulation controller 46 is responsible for causing the all of the propulsor units 36, 38 to pivot in concert toward the desired angle to achieve thrust in the desired direction.

The articulation controller 46 can take many different forms. For example, in the illustrated examples the articulation controller 46 takes the form of a mechanical linkage configured to manipulate the angle of all propulsion units 36, 38 at the same time. As perhaps best seen in FIGS. 6 and 7, the articulation controller 46 includes a parallelogram linkage associated with each primary drive shaft 40. The parallelogram linkage has a common driver link 48 that kinetically connects to a crank 50 extending from each primary drive shaft 40. Each crank 50 is the same length so that the angular displacements of each drive shaft 40 are equal. An actuator 52 is operatively coupled between the driver link 48 and the airframe 26. In the illustrated examples, the actuator 52 is of the linear actuator type, and more specifically a screw jack. However, other types of linear actuators can be used, as well as other types of actuators. The parallelogram linkage configuration is, of course, but one of many, many direct ways to accomplish synchronized rotation of each propulsor set about the respective the articulation axes.

Although not shown, it is contemplated that the side body articulating propulsion system will include a back-up or redundant articulation controller. The back-up articulation controller could be used to maintain flight control in the event of malfunction of the primary articulation controller 46.

Figure 10:
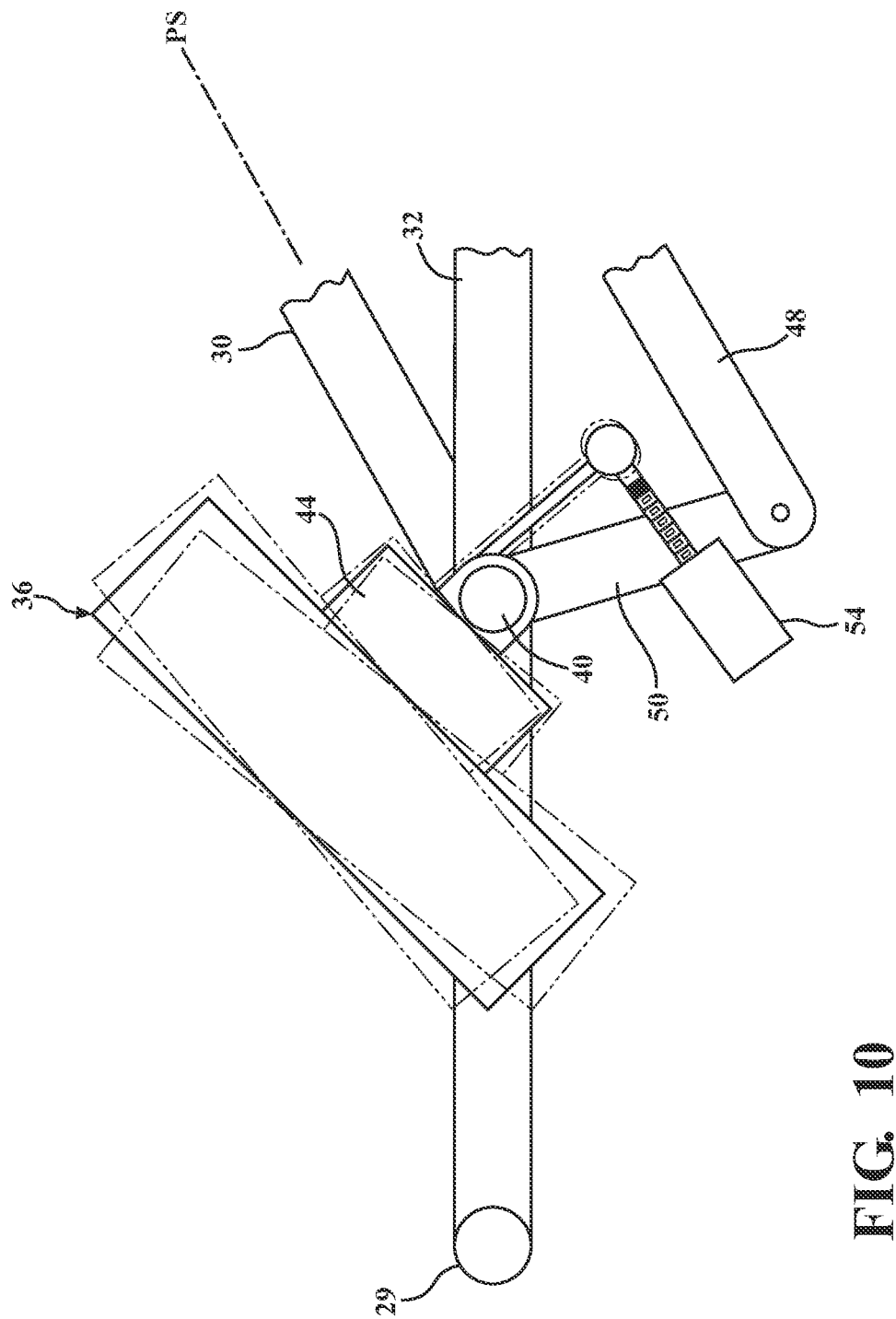
FIG. 10 is a highly simplified view of an exemplary trim adjust as may be operatively connected to the propulsor set(s) most closely proximate the nose and/or tail of said fuselage.

Turning now to FIG. 10, the articulation controller 46 may include a trim adjust 54. The trim adjust 54 is configured to independently over-articulate or under-articulate a select one of the propulsor sets. In one embodiment, a trim adjust 54 is operatively connected to the propulsor set most closely proximate the nose 14 of the fuselage, and another trim adjust operatively connected to the propulsor set most closely proximate the tail 16 of the fuselage. That is, the first and last, i.e., leading and trailing, propulsor sets are fitted with a trim adjust 54. With this feature, the pilot has fine control of the thrust vector, enabling a fine tuning or trimming to precise attitudes and or altitudes. The trim adjust 54 can be designed and implemented in a variety of ways; that method shown in FIG. 10 is but one example.

In one contemplated embodiment (not shown), the articulation controller 46 comprises a servomotor operatively attached to each propulsor set, or perhaps even attached to each individual propulsor unit 36, 38. A microprocessor or other suitable device then instructs each servomotor to adjust the angle of each propulsor set, or each propulsor unit 36, 38, by the desired degree. Other forms of motion control are also contemplated.

Another particular advantage of the triangular airframe 26 configuration described here is that the airframe 26 can be easily modified to construct an aircraft 12 of larger size and/or for specialized use. Such modification can be accomplished by adding to the airframe 26 an expansion module. An endless variety of expansion modules can be envisioned by those of skill in the art. Two exemplary designs are suggested in FIGS. 8 and 9.

As previously mentioned, an ante-module 29 can be attached to the leading end of the primary module, such as by welding or fasteners or integral extensions. Although FIGS. 8 & 9 shown the ante-module as a short cantilever stub extending longitudinally from the base 32, larger and more elaborate structures can be devised to adequately support a cockpit or other features adjacent the nose 14 of the aircraft 12.

Figure 8:
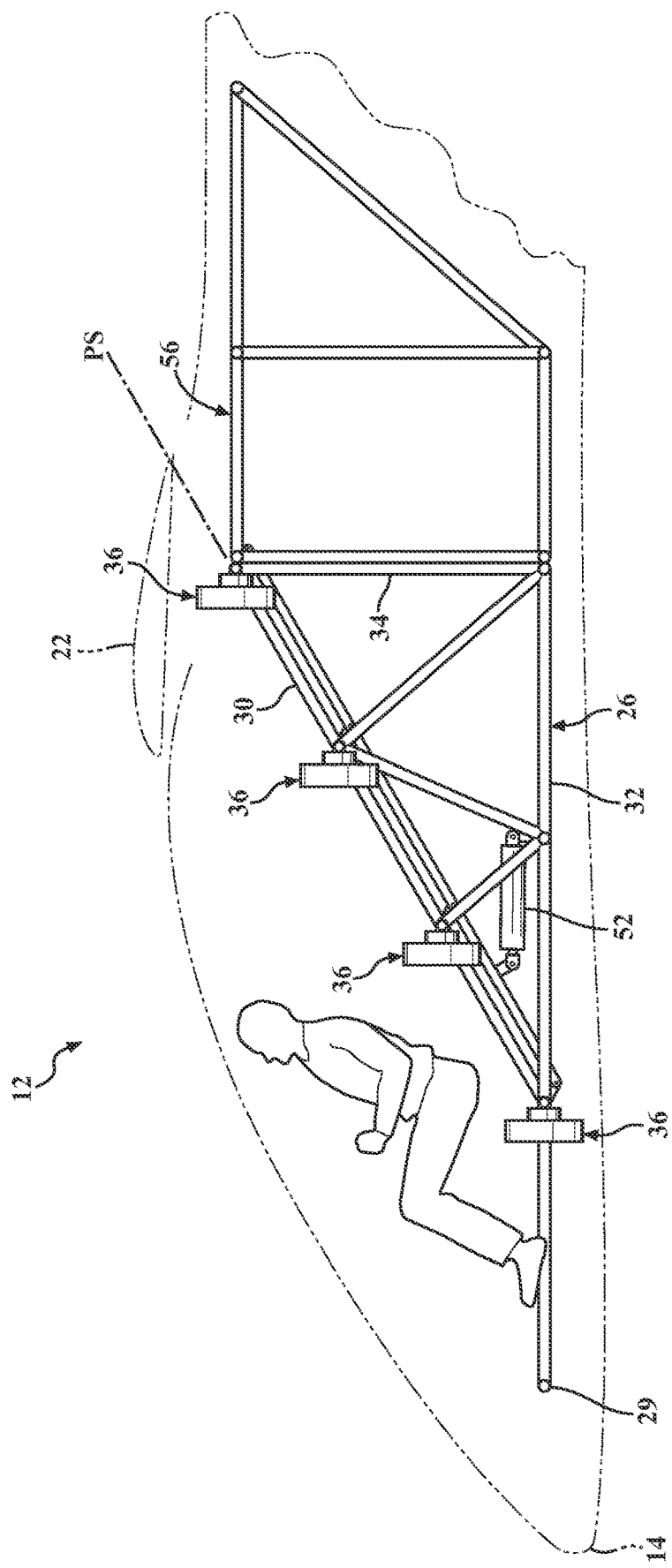
FIG. 8 is a side view of a modular airframe having a triangular leading primary module and an aft expansion module extending the length of the fuselage, according to an embodiment of the invention.

In the example of FIG. 8, the expansion module is generally indicated at 56. Here, the expansion module 56 extends longitudinally tailward from the aft end 34 of the primary module, and serves to lengthen the fuselage. The example of FIG. 8 most closely corresponds with the sizes and shapes of aircraft 12 depicted in FIGS. 1-4C. Naturally, the length and specific design features of the expansion module 56, in combination with the overall airframe 26, are subject to the discretion of the designer.

Figure 9:
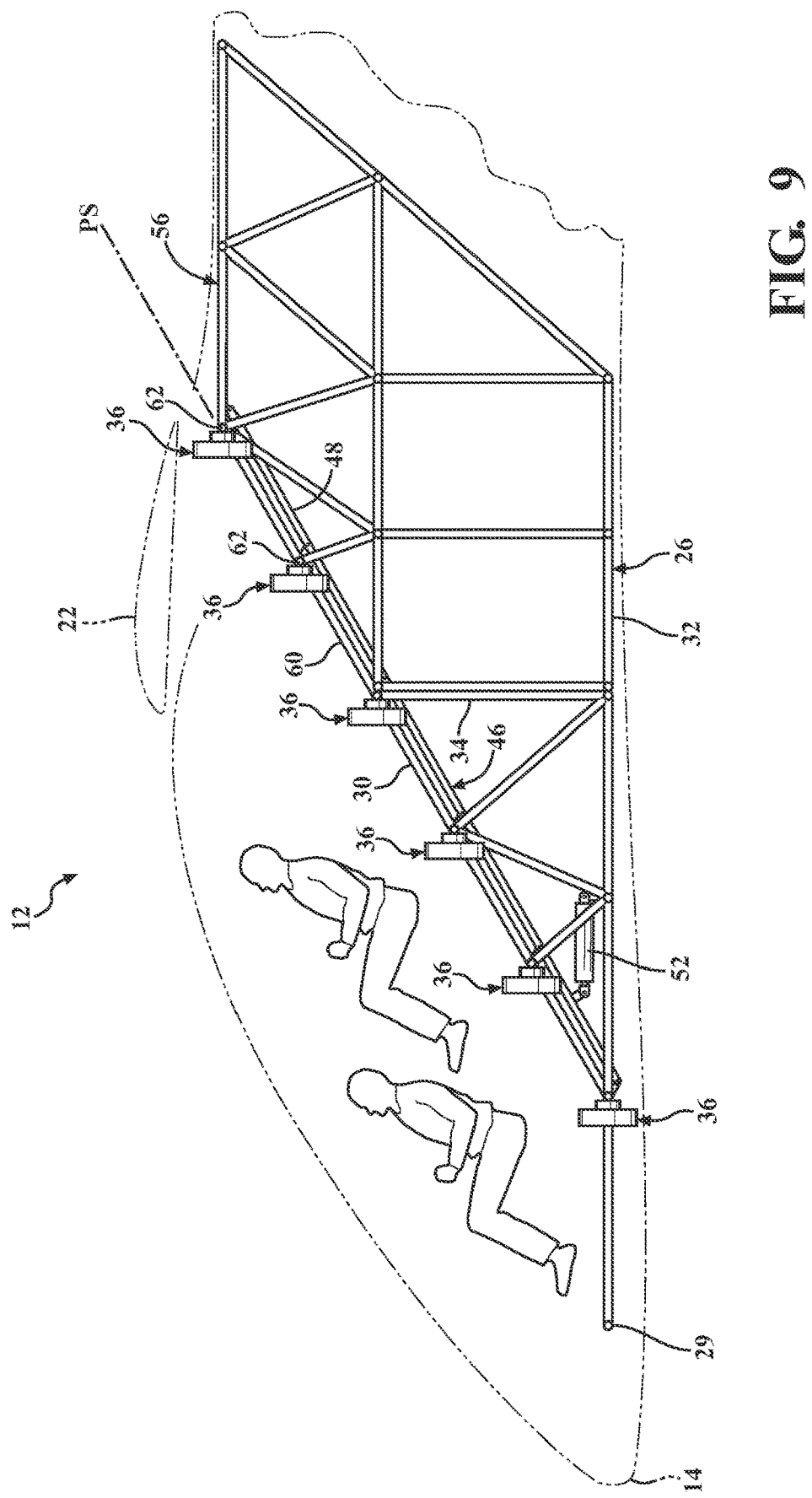
FIG. 9 is a side view of another modular airframe having the triangular leading primary module of FIG. 8 but and an aft expansion module in which are carried two additional propulsor sets commonly actuated by the one articulation controller, according to an embodiment of the invention.

In the example of FIG. 9, the expansion module is generally indicated at 58. Although the illustration depicts two pilots seated one behind the other at different elevations, the pilots could instead be seated side by side. In this case, the expansion module 58 not only serves to lengthen the fuselage but also increases thrust by adding two propulsor sets to the side body articulating propulsion system. The expansion module 58 has a front leg 60 that parallels the front leg 30 of the primary module. The front leg 60 carries, or supports, at least one expansion journal 62. The example of FIG. 9 shows two expansion journals. Like the primary journals 28, each expansion journal 62 establishes an expansion axis that is parallel to the articulation axes of the primary module. Moreover, each expansion axis is offset from the next adjacent the articulation axis and/or next adjacent expansion axis by the same the fixed rise in the vertical direction and the same the fixed run in the longitudinal direction as in the primary module. As a result, all of the articulation axes and all of the expansion axes are equally spaced apart from one another, and all lie along the propulsor slope PS. In this manner, the expansion module enables expansion of the side body articulating propulsion system without disturbing the geometries previously stated that control the propulsor slope PS.

Still considering FIG. 9, an expansion drive shaft is operatively associated with each expansion journal 62. Similar to the primary drive shafts 40, each expansion drive shaft is rotatably supported in the associated the expansion journal 62 for rotary movement about the expansion axis thereof. A propulsor set is associated with the expansion journal. The propulsor set is preferably identical to the propulsor sets carried in the primary module, having paired port 36 and starboard 38 propulsor units attached to the free ends of the drive shaft.

The same articulation controller 46 can be expanded to control and articulate the propulsor set(s) carried in the expansion module 58. Considering the parallelogram linkage configuration, for example, the driver link 48 can be easily extended to connect with similarly sized/shaped cranks on the expansion drive shafts. As a consequence, all of the propulsor sets (six sets in the example of FIG. 9) are selectively articulated by the pilot to achieve VTOL and forward flight performance.

The expansion modules 56, 58 are preferably engineered with Common Configuration Attach Points along the aft end 34 for connectivity to components and parts, advancing prime systems integration to streamline the production, reducing time and cutting costs. As a result, the invention can enable a true family of optimized, versatile, VTOL aircraft 12. The various platform capabilities can be envisioned, ranging easily from small 500-pound drones to 50,000-pound heavy lift platforms. The scalable airframes 26 can be profiled as small, light, medium and heavy. Each airframe 26 profile can be structurally designed and optimized for performance. The airframe 26 can be extended and widened at manufacturing utilizing the Configuration Attach Points. Longer range, higher speeds, common airframes with modular elements can be used to cover an entire spectrum of applications for the aircraft 12.

Returning to FIGS. 1-4C, the side body articulating propulsion system may include nacelles on each side of the fuselage. A port nacelle 64 surrounds the port propulsor units 36, whereas a starboard nacelle 66 surrounds the starboard propulsor units 38. The port nacelle 64 and the starboard nacelle 66 may be designed to suit the intended application and provide a degree of safety to ground crew. In the illustrated examples, the nacelles 64, 66 are box-like structures each having outboard housing walls opposite the fuselage that are oriented vertically. To achieve optimal structural efficiency, each nacelle 64, 66 is in direct abutting engagement with the fuselage on an inboard side thereof. Each nacelle 64, 66 has a forward and upward facing intake opening bounded on its outboard side by the outboard housing wall. An intake grate may be used to cover each forward-facing intake opening. The intake grate will provide a degree of safety to both people and equipment. Moreover, each nacelle 64, 66 may be provided with a rearward and downward facing exhaust opening. The exhaust openings are bounded on their outboard sides by the outboard housing wall.

To state again, the nacelles 64, 66 are subject to wide-ranging design variation as determined by the aeronautical engineer. In some cases, the aeronautical engineer may be able to achieve optimal balance of the aircraft 12 by locating the fixed main wing 22 vertically above the port 64 and starboard 66 nacelles, as shown in FIG. 1.

The present invention is directed toward an aircraft 12 fitted with side body articulating propulsion. In one expression of the concept, side body articulating propulsion is accomplished by attaching multiple propulsor sets to the port 18 and starboard 20 sides of the fuselage/airframe 26 via respective primary drive shafts 40 that extend through the fuselage/airframe 26. Each propulsor set is composed of a port 36 and starboard 38 propulsor unit. The propulsor units 36, 38 rotate with or on the primary drive shaft 40 via a mechanical linkage to provide forward flight (see FIGS. 2, 4C and 7) and rotate to provide vertical take-off and landing (VTOL) capabilities (see FIGS. 3, 4A, 5 and 6).

A feature of the invention is that the propulsor units 36, 38 on the side of the fuselage/airframe 26 do not interfere (or interfere only insignificantly) with the airflow of other propulsor units 36, 38 in forward flight or in VTOL flight, which increases propulsive energy. This can be appreciated by comparison of FIGS. 4A-C and 11. The structural feature enabling this advantage is two-fold. First the airframe 26 is configured to establish a propulsor slope PS in the range of about 30-60 degrees. The propulsor slope PS is, of course, described by a common rise/run expression. Second, the propulsor units 36, 38 are designed with propellers 42 having a major diameter scaled between about 0.75-1.25 times the smaller of the common rise/run. By arranging the propulsor units 36, 38 according to this positioning scheme longitudinally along the airframe 26 sides, an upwind propulsor unit 36, 38 will not interfere (at least not significantly) with any downwind propulsor units 36, 38 in VTOL mode and through transition to forward flight.

In this invention, the propulsor sets are stacked proportionally (angling up or down) beginning adjacent the nose 14 of the aircraft 12. The sizing of each propulsor unit 36, 38 is determined relative to its attach point in the airframe 26 to optimize propulsive airflow-thrust for forward and VTOL flight. Using the principles of this invention, the airflow-thrust can be designed so as to not obstruct of interfere appreciably with other produced airflow-thrust during all phases of operation.

The propulsor units 36, 38 may be powered by a lightweight electric motor(s) attached to a round, square, or triangular primary drive shaft 40 that extends through the airframe 26 and attaches to a similar electric motor(s) on the other side of the airframe 26. In one example, the aircraft 12 can be configured with a 6 seat/9,000 lb. capacity utilizing eight (8) propulsor units 36, 38. Each articulating primary drive shaft 40 is connected by an adjustable linkage or linkages. The linkage can be manipulated via two separate actuators 52—a primary and a back-up—which receive electric inputs from the command and control unit via the fly-by-wire inputs from the pilot with flight envelope protections.

Although not shown, the aircraft 12 may include a landing gear system. While many landing gear designs are possible, the invention contemplates a landing gear system that enables convention take-off and landing and is also suited to VTOL operation. The landing gear system should, if practical, be fully or partially retractable for forward flight efficiency. A 3-position landing gear system is envisioned. Depending on the runway conditions, a fully retractable landing gear can be configured for take-off and landing as a conventional aircraft 12 in which a component of forward airspeed is required, or reconfigured to a position in which the gear is hyper-extended to accommodate austere landing areas and/or provide auto-leveling capabilities. For normal operations, the landing gear may be retracted and extended. For VTOL operations in austere locations, a cockpit gear selector can be moved to one position for landing rough terrain in VTOL only. The landing gear may be designed to level the aircraft 12 automatically.

The side body articulating propulsion system is well-suited for manned or unmanned transportation over short or long ranges. The scalable/modular nature of the airframe 26 enables aircraft 12 for drone-like sizes, mid-sizes comparable to the UH-60 Blackhawk, and larger platforms comparable to the UH-47 Chinook. An aircraft 12 fitted with a side body articulating propulsion system according to the principles of this invention will have many advantages. Advantages may include sound reduction compared with traditional aircraft. A narrow center of gravity both vertically and longitudinally. Stealthy protections. High-speed forward flight as well as vertical takeoff and landing VTOL operations. Increased safety compared with traditional rotorcraft due to the propulsor units 36, 38 being concealed in nacelles 64, 66. A modular airframe 26 design having attach points for an ante-module 29 and/or expansion module 56, 58 allowing for scale-up during manufacturing and assembly to meet desired payload specifications. And the ability to function in aircraft 12 designs with or without a fixed main wing 22.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. An aircraft configured for forward flight and vertical take-off/landing, said aircraft comprising:
a fuselage having a nose and a tail defining a longitudinal direction, said fuselage having a port side and a starboard side defining a lateral direction, said fuselage having a height defining a vertical direction that lies orthogonal to both of said longitudinal and lateral directions,
an airframe structurally supporting said fuselage, said airframe including a plurality of primary journals extending laterally through said fuselage, each said primary journal establishing an articulation axis, each said articulation axis being offset from the next adjacent articulation axis by a common rise in the vertical direction and a common run in the longitudinal direction such that all of said articulation axes are equally spaced apart from one another and lie along a propulsor slope defined by said common rise and said common run, said propulsor slope being in the range of about 30-60 degrees measured from said longitudinal direction, and
a side body articulating propulsion system operatively connected to said airframe, said side body articulating propulsion system including a plurality of propulsor sets, each said propulsor set associated with a respective one of said primary journals of said airframe, each said propulsor set comprising a port propulsor unit and a starboard propulsor unit, an articulation controller collectively connecting each said propulsor set for synchronized rotation of said plurality of propulsor sets about the respective said articulation axes between VTOL and forward flight positions.

2. The aircraft of claim 1 wherein said plurality of primary journals comprises at least three primary journals.

3. The aircraft of claim 1 wherein said airframe has a primary module, said plurality of primary journals disposed in said primary module, a primary drive shaft operatively associated with each said primary journal, each said primary drive shaft supporting the associated said port and starboard propulsion units for rotary movement about said articulation axis thereof.

4. The aircraft of claim 3 wherein said articulation controller includes a parallelogram linkage associated with each said primary drive shaft.

5. The aircraft of claim 4 wherein said parallelogram linkage has a common driver link, an actuator operatively coupled between said driver link and said airframe, said actuator comprising a linear actuator.

6. The aircraft of claim 3 wherein said airframe includes an expansion module extending longitudinally tailward from said aft end of said primary module, said expansion module including at least one expansion journal establishing an expansion axis parallel to said articulation axes, said expansion axis being offset from the next adjacent said articulation axis by the same said fixed rise in the vertical direction and the same said fixed run in the longitudinal direction such that said expansion axis and all of said articulation axes are equally spaced apart from one another and lie along said propulsor slope, at least one propulsor set associated with said expansion journal.

7. The aircraft of claim 6 wherein said propulsor set includes an expansion drive shaft operatively associated with each said expansion journal of said airframe, each said expansion drive shaft rotatably supported in the associated said expansion journal for rotary movement about said expansion axis thereof.

8. The aircraft of claim 7 wherein said articulation controller includes a parallelogram linkage associated with said primary drive shaft and each said expansion drive shaft, said parallelogram linkage having a common driver link, an actuator operatively coupled between said driver link and said airframe, said parallelogram linkage operatively associated with said expansion drive shaft.

9. The aircraft of claim 3 wherein said primary module has a generally right or acute scalene triangular shape, said primary module having a front leg and a base intersecting said front leg adjacent said nose of said fuselage, said primary module having an aft end intersecting said front leg and said base adjacent said tail of said fuselage, an included angle measured between said base and said front leg being in the range of about 30-60 degrees, a cargo cavity in said airframe extending through said aft end.

10. The aircraft of claim 1 wherein said articulation controller includes at least one trim adjust configured to independently over-articulate or under-articulate a select one of said propulsor sets.

11. The aircraft of claim 10 wherein said trim adjust is operatively connected to said propulsor set most closely proximate one of said nose and said tail of said fuselage.

12. The aircraft of claim 1 wherein said propulsor slope is angled vertically upwardly from said longitudinal direction.

13. The aircraft of claim 1 further including a port nacelle surrounding said port propulsor units, a starboard nacelle surrounding said starboard propulsor units, said port nacelle and said starboard nacelle each having an outboard housing wall opposite said fuselage, said port nacelle and said starboard nacelle each having a forward and upward facing intake opening bounded on the outboard side thereof by said outboard housing wall.

14. The aircraft of claim 13 wherein said port nacelle and said starboard nacelle are each in direct abutting engagement with said fuselage.

15. The aircraft of claim 1 wherein each said port propulsor unit and each said starboard propulsor unit has at least one propeller, said propeller having a major diameter between about 0.75-1.25 times the smaller of said fixed rise and said fixed run.

16. The aircraft of claim 1 further including a fixed main wing connected to said fuselage.

17. The aircraft of claim 1 wherein each said port and starboard propulsor unit includes a propeller having a hub defining a rotary axis, at least one motor operatively connected to each said propeller for inducing high-speed rotation about said rotary axis to produce a thrust generally perpendicular to the respective said articulation axis, a plurality of blades extending radially from said hub, each said blade terminating at a distal tip, an annular thrust ring concentrically disposed about said hub, said thrust ring joining each of said tips of said blades into a monolithic structure.

18. An aircraft configured for forward flight and vertical take-off/landing, said aircraft comprising:
a fuselage having a nose and a tail defining a longitudinal direction, said fuselage having a port side and a starboard side defining a lateral direction, said fuselage having a height defining a vertical direction that lies orthogonal to both of said longitudinal and lateral directions,
an airframe structurally supporting said fuselage, said airframe including at least three primary journals extending laterally through said fuselage, each said primary journal establishing an articulation axis, each said articulation axis being offset from the next adjacent articulation axis by a common rise in the vertical direction and a common run in the longitudinal direction such that all of said articulation axes are equally spaced apart from one another and lie along a propulsor slope defined by said common rise and said common run, said propulsor slope being in the range of about 30-60 degrees measured from said longitudinal direction, a side body articulating propulsion system operatively connected to said airframe, said side body articulating propulsion system including a plurality of propulsor sets, each said propulsor set associated with a respective one of said primary journals of said airframe, a primary drive shaft operatively associated with each said primary journal of said airframe, each said propulsor set comprising a port propulsor unit and a starboard propulsor unit, each said primary drive shaft rotatably supporting the associated said port and starboard propulsion units for rotary movement about said articulation axis thereof, each said port propulsor unit and each said starboard propulsor unit having at least one propeller, said propeller including a hub defining a rotary axis, at least one motor operatively connected to each said propeller for inducing high-speed rotation about said rotary axis to produce a thrust generally perpendicular to the respective said articulation axis, an articulation controller collectively connecting each said propulsor set for synchronized rotation about the respective said articulation axis between VTOL and forward flight positions, a port nacelle surrounding said port propulsor units, a starboard nacelle surrounding said starboard propulsor units, said port nacelle and said starboard nacelle each being in direct abutting engagement with said fuselage, said port nacelle and said starboard nacelle each having an outboard housing wall opposite said fuselage, said port nacelle and said starboard nacelle each having a forward and upward facing intake opening bounded on the outboard side thereof by said outboard housing wall, said port nacelle and said starboard nacelle each having a rearward and downward facing exhaust opening bounded on the outboard side thereof by said outboard housing wall.

19. The aircraft of claim 18 wherein said propulsor slope is angled vertically upwardly from said longitudinal direction, said airframe having a primary module, said plurality of primary journals disposed in said primary module, said primary module having a generally triangular shape defined by a front leg extending parallel to said propulsor slope of said articulation axes, said triangular shape of said primary module being a generally right or acute scalene triangle, said primary module having a generally horizontal base intersecting said front leg adjacent said nose of said fuselage, said primary module having a generally vertical aft end intersecting said front leg and said base adjacent said tail of said fuselage, a cargo cavity in said airframe extending through said aft end, a fixed main wing connected to said fuselage.

20. The aircraft of claim 18 wherein said articulation controller includes a parallelogram linkage associated with each said primary drive shaft, said parallelogram linkage having a common driver link, an actuator operatively coupled between said driver link and said airframe, said actuator comprising a linear actuator, said articulation controller including at least one trim adjust configured to independently over-articulate or under-articulate a select one of said propulsor sets.

\* \* \* \* \*